US012667228B2

(12) United States Patent (10) Patent No.: US 12,667,228 B2

Hunter et al. (45) Date of Patent: Jun. 30, 2026

(54) QUICK RELEASE ATTACHMENT MECHANISM ON A STAND MIXER

(71) Applicant: Haier US Appliance Solutions, Inc., Wilmington, DE (US)

(72) Inventors: Matthew R. Hunter, Louisville, KY (US); Joseph Mazzella, Flushing, NY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 862 days.

(21) Appl. No.: 17/959,802

(22) Filed: Oct. 4, 2022

(65) Prior Publication Data

US 2024/0108173 A1 Apr. 4, 2024

(51) Int. Cl.
*A47J 43/07* (2006.01)

(52) U.S. Cl.
CPC ................................. *A47J 43/0711* (2013.01)

(58) Field of Classification Search
CPC . A47J 43/0705; A47J 43/0711; F16B 7/0413; F16B 21/165
See application file for complete search history.

(56) References Cited

U.S. PATENT DOCUMENTS

| | | | | |
|---|---|---|---|---|
| 3,420,497 | A | * | 1/1969 | Wilcox ................. F16L 37/413 251/149.6 |
| 4,198,080 | A | * | 4/1980 | Carpenter ............. A61M 39/26 403/325 |
| 8,646,811 | B1 | * | 2/2014 | Chang .................... F16L 37/23 285/1 |
| 8,807,525 | B2 | * | 8/2014 | Chang .................... F16L 37/34 251/149.6 |
| 9,511,213 | B2 | * | 12/2016 | Doll ........................ F16L 37/23 |
| 10,258,050 | B2 | | 4/2019 | Jahge et al. |
| 10,458,590 | B2 | * | 10/2019 | Attia ....................... F25B 45/00 |
| 11,248,835 | B1 | * | 2/2022 | Nuss ...................... F25D 27/00 |
| 2019/0086013 | A1 | * | 3/2019 | Hafele ................... F16L 37/23 |

FOREIGN PATENT DOCUMENTS

| | | |
|---|---|---|
| CN | 208876286 U | 5/2019 |
| CN | 110200523 A | 9/2019 |
| CN | 209474453 U | 10/2019 |
| CN | 110787706 A | 2/2020 |
| EP | 3503780 B1 | 7/2020 |

* cited by examiner

*Primary Examiner* — Marc C Howell

(74) *Attorney, Agent, or Firm* — Dority & Manning, P.A.

(57) ABSTRACT

A quick release attachment mechanism to releasably join a stand mixer drivetrain to an attachment insert. The mechanism includes one or more retaining balls to axially fix the attachment insert in the assembly and a plurality of cooperating walls to fix the attachment insert against rotational displacement.

20 Claims, 4 Drawing Sheets

QUICK RELEASE ATTACHMENT MECHANISM ON A STAND MIXER

FIELD OF THE INVENTION

The present disclosure is related generally to a quick release attachment mechanism for vertically oriented food processing and mixing devices, such as stand mixers.

BACKGROUND OF THE INVENTION

Stand mixers generally include a plurality of food engagement utensils for various tasks. A motor and drivetrain in the stand mixer provide torque to the utensils. An attachment mechanism is typically used to releasably join the drivetrain to the utensils with a portion of the mechanism affixed to the stand mixer and a mating attachment insert affixed to the utensils. Beneficially, the mechanism should provide easy utensil attachment and detachment, allow various rotational positions for the utensils within the coupling mechanism, and be capable of transferring reversable torque to the utensils. Some known attachment mechanisms can be cumbersome to operate, provide limited rotational positions for the utensil, and are unable to reversibly apply torque to the utensils.

Accordingly, an attachment assembly for stand mixers that addresses one or more of the above-described challenges would be beneficial.

BRIEF DESCRIPTION OF THE INVENTION

The present subject matter is directed to a quick release assembly for a stand mixer.

Aspects and advantages of the invention will be set forth in part in the following description, may be apparent from the description, or may be learned through practice of the invention.

In one exemplary aspect, an attachment assembly on a stand mixer is presented. The attachment assembly comprises a body having a distal end with a shank portion and a proximal end with a receiving portion, the receiving portion including at least a first wall defining an insert receiving cavity, the first wall having a first through hole formed radially therethrough. An outer retainer is disposed around an outside surface of the receiving portion and supported for axial displacement. A shield is arranged in the receiving portion and supported for axial displacement between a first position and a second position distal to the first position. A retaining ball is received within the first through hole for displacement between an unloaded position and a loaded position. When the shield is in the first position, it radially supports the retaining ball in the unloaded position and the retaining ball moves radially inward to the loaded position when the shield is in the second position.

In another example aspect, an attachment assembly on a stand mixer is presented. The attachment assembly comprises a body having a distal end with a shank portion and a proximal end with a receiving portion. The receiving portion includes six cavity walls defining an insert receiving cavity, a first cavity wall having a first through hole formed therethrough and a second cavity wall having a second through hole formed therethrough. An outer retainer is disposed around an outside surface of the receiving portion and supported for axial displacement and a shield arranged in the insert receiving cavity and supported for axial displacement between a first position and a second position distal to the first position. A first retaining ball is received within the first through hole for displacement between an unloaded position and a loaded position, and a second retaining ball is received within the second through hole for displacement between an unloaded position and a loaded position. When the shield is in the first position it radially supports the first and second retaining balls in the unloaded position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Figure 1:
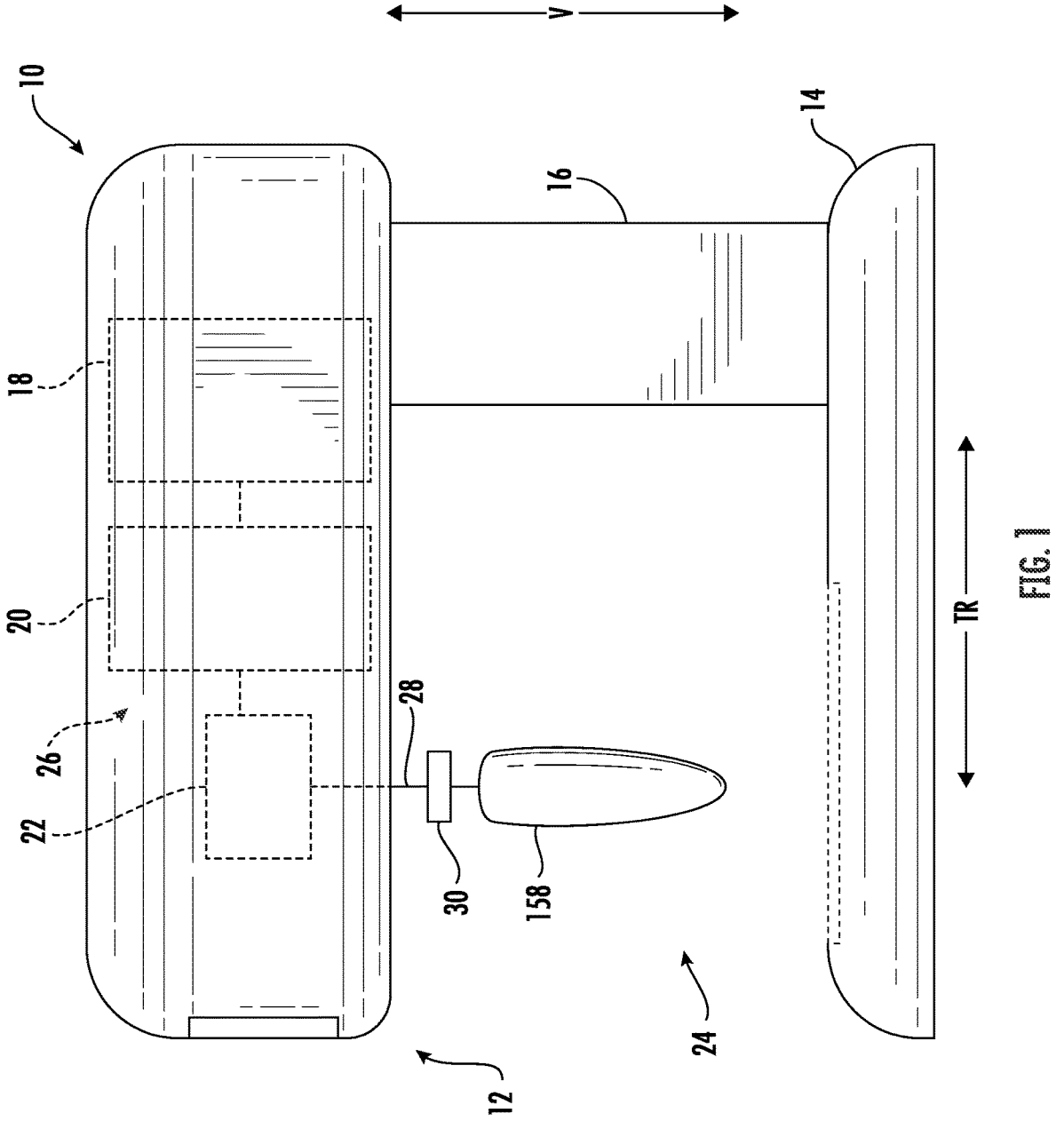
FIG. 1 illustrates a side view of a stand mixer according to an example embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

As used herein, references to a vertical direction correspond to the vertical axis of the quick release attachment mechanism in use in a typical stand mixer for ease of description which corresponds to the generally understood vertical direction. The disclosed embodiments are not limited in use in the vertical position. References to a radial direction are perpendicular to the vertical axis, with radially inward meaning directed to the vertical axis, and radially outward meaning in the opposite direction, radially away from the vertical axis. Distal, distally, and other references to the distal direction means a direction towards the identified distal end as illustrated. Similarly, proximal, proximally, and other references to the proximal end means in a direction towards the identified proximal end as illustrated.

FIG. 1 provides a side view of a stand mixer 10 according to an example embodiment of the present subject matter. It will be understood that stand mixer 10 is provided by way of example only and that the present subject matter may be used in or with any suitable stand mixer in alternative example embodiments. Moreover, stand mixer 10 of FIG. 1 defines a vertical direction V and a transverse direction TR, which are perpendicular to each other. It should be understood that these directions are presented for example purposes only, and that relative positions and locations of certain aspects of stand mixer 10 may vary according to specific embodiments, spatial placement, or the like.

Stand mixer 10 may include a housing 12. In detail, housing 12 may include a motor 18, a base 14, and a column 16. Housing 12 may house various mechanical and/or electrical components of stand mixer 100, such as the motor 18, a reduction gearbox 20, and a bevel gearbox 22. Base 14 may support housing 12. For example, housing 12 may be mounted (e.g., pivotally) to base 14 via column 16, e.g., that extends upwardly (e.g., along the vertical direction V) from base 14. Housing 12 may be suspended over a mixing zone 24, within which a mixing bowl (not shown) may be disposed and/or mounted to base 14.

A drivetrain 26 may be provided within housing 12 and is configured for coupling motor 18 to a mixer shaft 28, such that shaft 28 is rotatable via motor 18 through drivetrain 26. Drivetrain 26 may include reduction gearbox 20, bevel gearbox 22, etc. Mixer shaft 28 may be positioned above mixing zone 24 and a utensil 158, such as a beater, whisk, or hook, may be removably mounted to mixer shaft 28. Utensil 158 may rotate within a bowl (not shown) in mixing zone 24 to beat, whisk, knead, etc. material within the bowl during operation of motor 18. The mixer shaft 28 may be releasably attached to utensil 158 via an attachment mechanism 30. A portion of the attachment mechanism 30 may be included on the mixer shaft 28 with a cooperating portion included on the utensil 158.

As noted above, motor 18 may be operable to rotate mixer shaft 28. Motor 18 may be a direct current (DC) motor in certain example embodiments. In alternative example embodiments, motor 18 may be an alternating current (AC) motor. Motor 18 may include a rotor and a stator. The stator may be mounted within housing 12 such that the stator is fixed relative to housing 12, and the rotor may be coupled to mixer shaft 28 via drivetrain 26. A current through windings within the stator may generate a magnetic field that induces rotation of the rotor, e.g., due to magnets or a magnetic field via coils on the stator. The rotor may rotate at a relatively high rotational velocity and relatively low torque. Thus, drivetrain 26 may be configured to provide a rotational speed reduction and mechanical advantage between motor 18 and mixer shaft 28.

Figure 2:
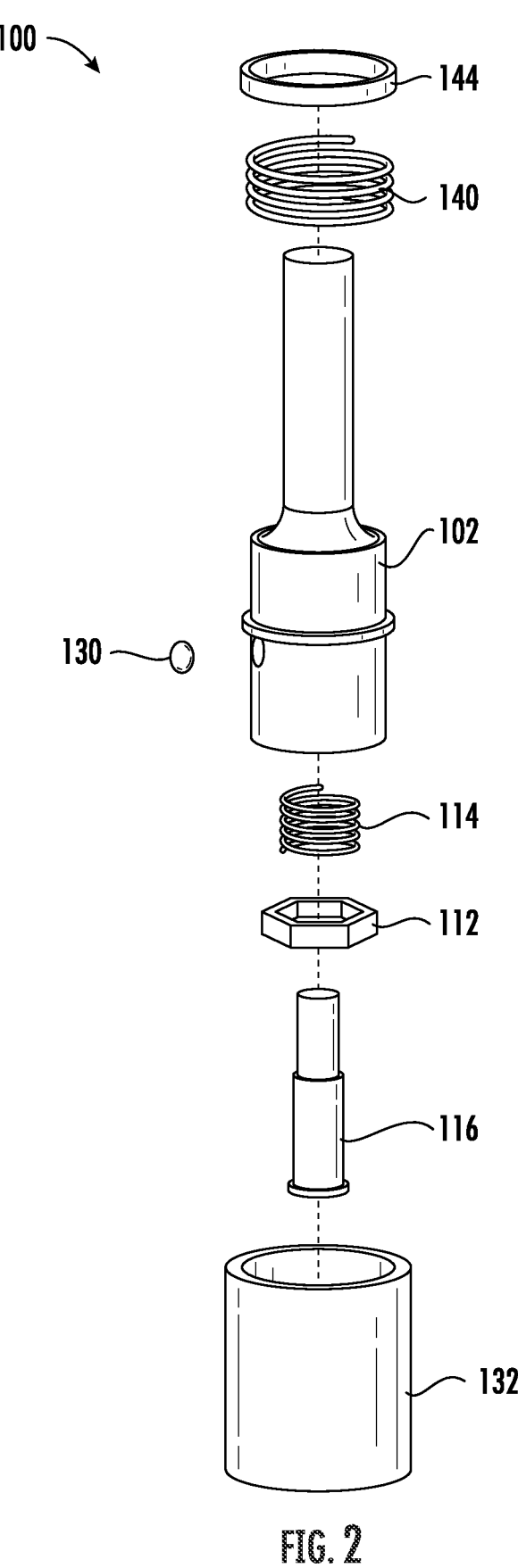
FIG. 2 provides an exploded view of a quick release attachment assembly in accordance with an embodiment of the present disclosure.

FIG. 2 is illustrative of a quick release attachment assembly 100, in accordance with this disclosure, in an exploded view for clarity. Individual components, their function, and interaction with other components is provided below. The body 102 accepts inner resilient member 114, shield 112 and post 116 in an internal portion. Outer retainer 132 confines retaining ball 130 in a passage in the body, and is fitted on the outside of the body 102 for vertical displacement against the influence of outer resilient member 140 which is confined by a portion of the body 102 and spring retainer 144.

Figure 3:
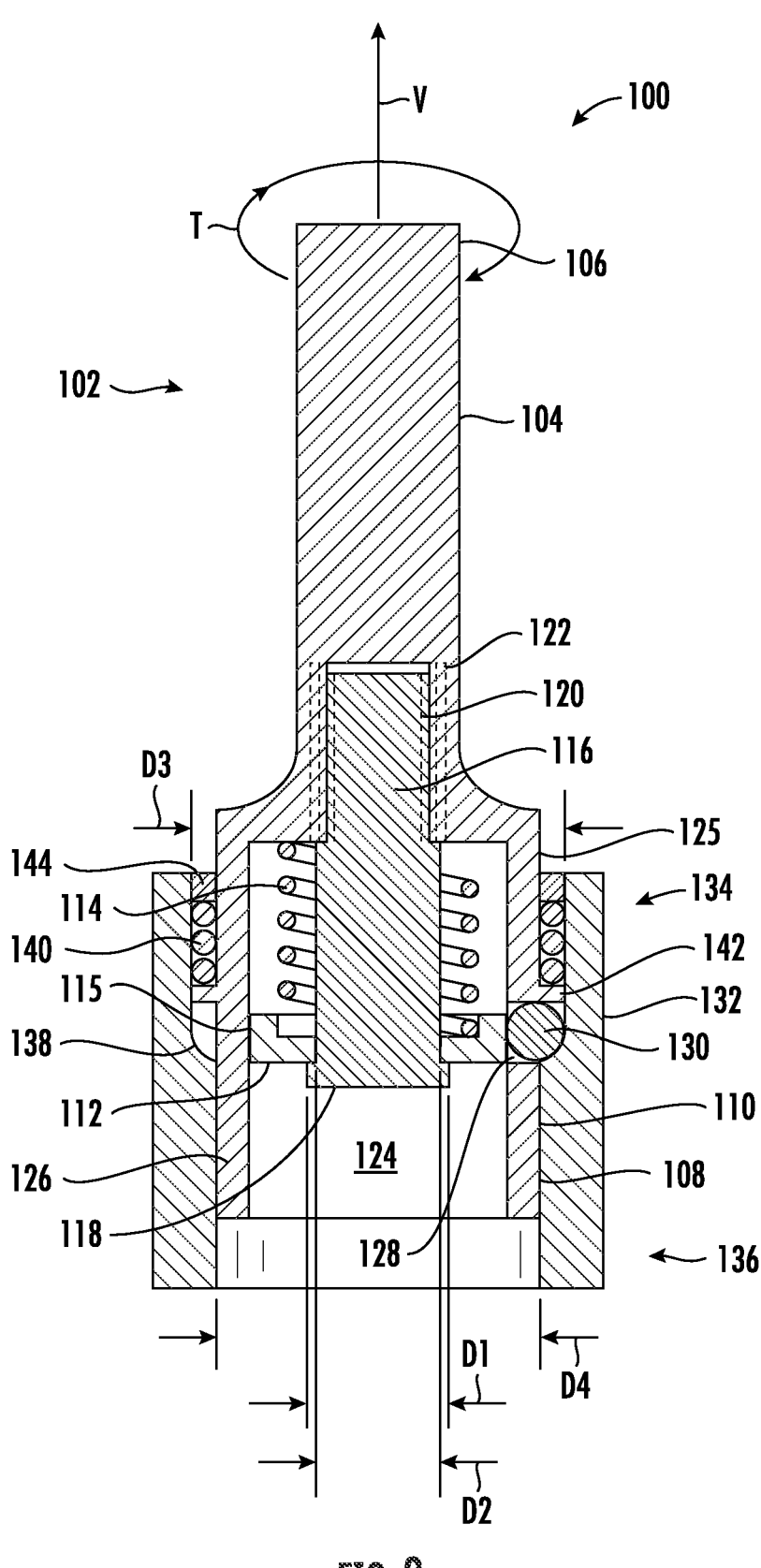
FIG. 3 provides a cross-sectional view of a quick release attachment assembly in a first position in accordance with an embodiment of the present disclosure.

FIG. 3 provides a cross-sectional view of a representative quick release attachment assembly 100 taken on a plane parallel to the vertical axis V. The assembly comprises a body 102 having a distal end 106 with a shank portion 104, and a proximal end 108 with a receiving portion 110. The shank portion 104 may be adapted for connection to a torque-producing device, for example a rotational drivetrain assembly in a stand mixer. Other devices providing torque T to the shank portion 104 may also be used. Torque T may be applied to the shank portion 104 in a first direction, a second direction, or alternatingly between a first direction and a second direction. For example, the torque T may be applied in a clockwise direction (when viewed along the vertical axis V from the distal end 106 towards the proximal end 108, as illustrated in FIG. 3), a counter-clockwise direction, or alternatingly between the clockwise and counter-clockwise directions to selectively effect rotation R (FIG. 4) in clockwise, counter-clockwise, or alternatingly clockwise and counter-clockwise directions. In embodiments, the shank portion 104 and the receiving portion 110 are axially aligned with the vertical axis V.

The receiving portion 110 at the proximal end 108 of the body 102 includes at least one cavity wall 126 forming the peripheral boundary of insert receiving cavity 124. In some embodiments, the insert receiving cavity 124 is defined by a plurality of cavity walls 126, for example four or six walls 126 generally of equal length and evenly spaced about the perimeter of the insert receiving cavity 124. In some embodiments, the insert receiving cavity 124 may be defined by fewer than four cavity walls 126 or may be defined by more than six cavity walls 126. In some embodiments, the outside surface 125 of the receiving portion is generally cylindrically shaped.

A through hole 128 may be formed through a cavity wall 126 and the outside surface 125 of the receiving portion 110. In some embodiments, a plurality of through holes 128 may be formed through a plurality of cavity walls 126, with the through holes 128 circumferentially arranged around the perimeter of the receiving portion 110. In some embodiments, one or more pairs of diametrically opposed through holes 128 are provided, with the axis of each of the pair of through holes 128 colinear with a diameter of the outside surface 125 (one pair shown in FIG. 4). In embodiments, a pair of diametrically opposed cavity walls 127 is provided with through holes 128 formed in each diametrically opposed cavity wall 127 such that the axis A1, A2 of each through hole 128 is perpendicular to the vertical axis V and the axes A1 and A2 are colinear, the holes being diametrically opposite (FIG. 4).

Figure 4:
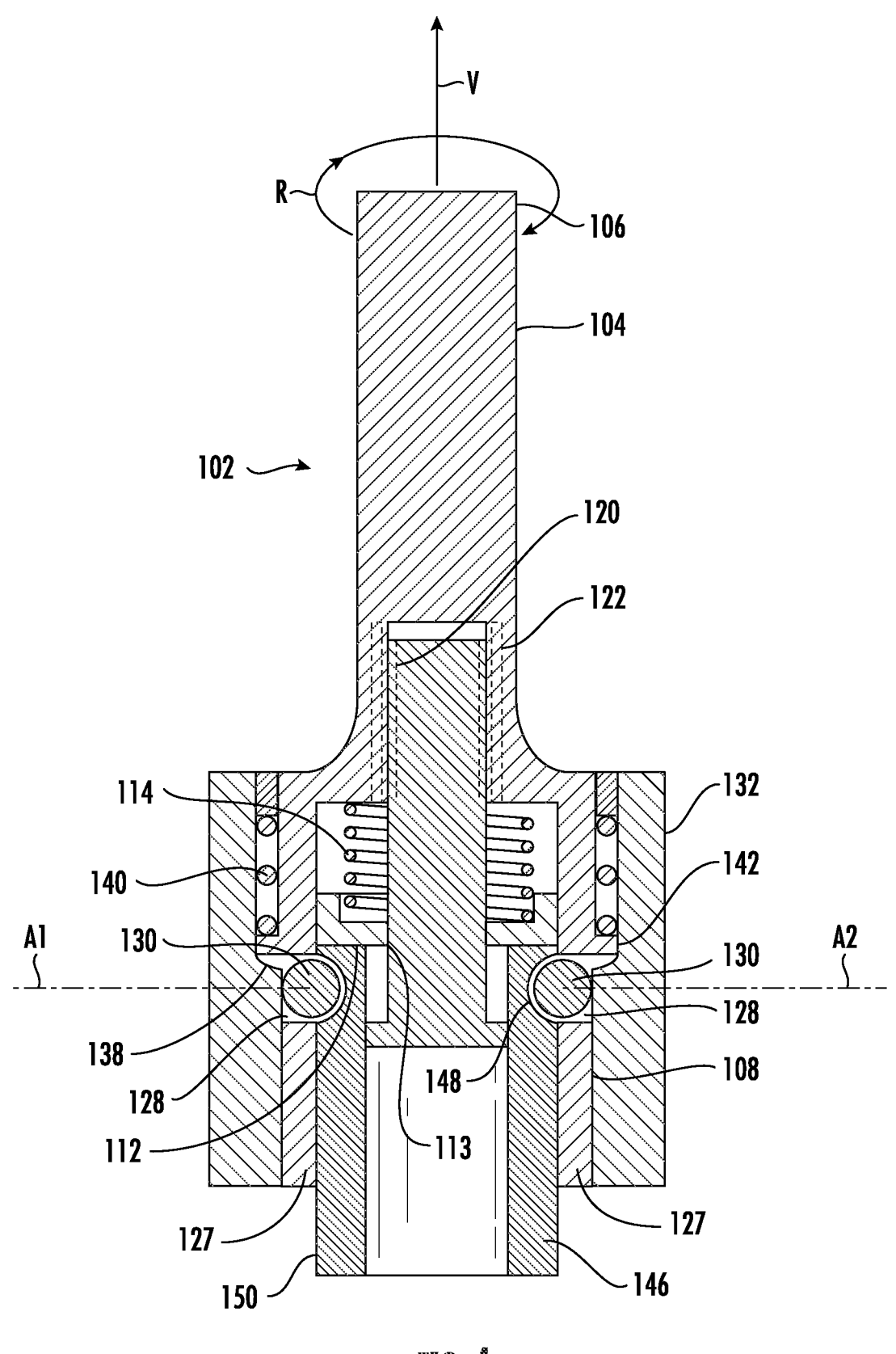
FIG. 4 provides a cross-sectional view of a quick release attachment assembly engaged with an attachment insert in a second position in accordance with an embodiment of the present disclosure.

Shield 112 may be disposed within the receiving portion 110 and supported for axial displacement between a first position (FIG. 3) and a second position (FIG. 4). As illustrated, in the second position, shield 112 is distal to the shield 112 in the first position. Shield 112 may be cup-shaped in some embodiments as illustrated; in other embodiments, shield 112 may have opposing proximal and distal faces, the opposing faces may be parallel. The outer perimeter 115 of the shield 112 is formed in a similar fashion as the peripheral boundary of insert receiving cavity 124. In embodiments, the outer perimeter 115 of the shield 112 is a polygon comprising a plurality of sides matching the plurality of cavity walls 126 in the receiving cavity 124 in number and general shape, and sized to allow sliding axial displacement within the receiving cavity 124. In some embodiments, the shield is configured and fitted in the receiving cavity 124 so that physical particulate infiltration is limited between the outer perimeter 115 of the shield and the cavity walls 126, thus reducing the occurrence of debris negatively impacting the movement of the shield 112 or the retaining ball 130.

In the illustrative embodiment shown, the shield 112 is biased in the proximal direction by an inner resilient member 114, for example a spring. The displacement of the shield in the proximal direction may be limited, for example, by a post 116 having a head 118 at the proximal portion with a dimension, for example a diameter D2, larger than a dimension D1 of the post 116. The shield 112 has an opening 113 positioned and sized to facilitate axial sliding over the post 116 but not allow shield 112 to pass over head 118. The inner resilient member 114 biases the shield 112 against the head 118 in the first position of FIG. 3 thus restraining axial displacement of the shield 112 in the proximal direction. The post 116 may have a threaded portion, for example a portion having external threads 120 at a distal portion configured to meshingly engage a set of threads formed on the body 102, for example internal threads 122. The meshing engagement of external and internal threads 120, 122 may facilitate the axial positioning of the head 118, and consequently the axial position of the shield 112 under the axial force of the resilient member 114, in the first position as illustrated in FIG. 3.

A retaining ball 130 may be received in the through hole 128 and supported for radial displacement between an unloaded position (FIG. 3) and a loaded position (FIG. 2). For example, the retaining ball 130 may move generally perpendicular to the vertical axis V within the through hole 128. In some embodiments, retaining ball 130 may be spherical in shape as illustrated. In embodiments having a spherical retaining ball 130, the diameter of the retaining ball 130 is greater than the thickness of the cavity wall 126. In some embodiments, a plurality of retaining balls 130 are received in an equal plurality of through holes 128. For example, two through holes 128 may be formed, each through a cavity wall 126 and each through hole 128 receiving a retaining ball 130 (FIG. 4). In some embodiments a pair of opposing through holes 128 may be formed through diametrically opposing cavity walls 126 with the axis of one through hole 128 colinear with the axis of the second through hole 128. When each of the pair of opposing through holes 128 receive a retaining ball 130, the retaining balls 130 will be diametrically opposed. Each of the diametrically opposed retaining balls 130 will function in a similar manner. Descriptions that follow may be directed to a singular retaining ball 130 in a singular through hole 128, understanding that the descriptions pertain to any number of retaining balls 130 in any number of through holes 128, for example two retaining balls 130, each received in a through hole 128.

An outer retainer 132 is disposed about the outside surface 125 of the receiving portion 110 and supported for axial displacement along the vertical axis V relative to the body 102. In embodiments, the outer retainer 132, when disposed on the receiving portion 110, is axially aligned with the shank portion 104 and the receiving portion 110. Outer retainer 132 may be a generally hollow cylinder having a distal portion 134 and a proximal portion 136. Internally, the outer retainer includes cylindrical surfaces with a distal internal diameter D3 and a proximal internal diameter D4 smaller that D3. A transition area 138 is provided between the D3 and D4 diameters. The transition area 138 may be a curved portion joining the proximal end of D3 with the distal end of D4 as illustrated. In some embodiments, a curved transition area 138 may have a radius sized to accept a retaining ball 130.

In the first position (FIG. 3), proximal displacement of the shield 112, as limited by the head 118, positions at least a portion of the shield 112 over the through hole 128 formed in cavity wall 126, blocking at least a portion of the through hole 128. The profile of the shield 112 is shaped to correspond with the cavity walls 126 defining the receiving cavity 124. Accordingly, a through hole 128 formed in any cavity wall 126, or any combination of cavity walls 126, would be at least partially blocked by the shield 112. With the shield in the first position as illustrated in FIG. 3, the shield 112 blocks the through hole 128 and prevents the retaining ball 130 from entering, or protruding into, the receiving cavity 124. Accordingly, in the first position, shield 112 radially supports the retaining ball 130 in the unloaded position (FIG. 3). The shield 112 may urge the retaining ball 130 radially outward against the distal diameter D3 of the outer retainer 132. In some embodiments, the retaining ball 130 is urged against the portion of the cavity wall 126 forming diameter D3.

An outer resilient member 140, for example a spring, biasing the outer retainer 132 towards the distal end of the body. The outer resilient member 140 is restrained between a spring retainer, lip 142, on the receiving portion outside surface 125 of the body 102 and a spring retainer 144 fitted between the receiving portion outside surface 125 and the distal internal diameter D3 at the distal end of the outer retainer 132. Distal displacement of the outer retainer 132 is limited by the retaining ball 130 constrained in the vertical direction by the through hole 128 and in the radial direction by the shield 112 and the transition area 138. The lip 142 may be formed on the receiving portion outside surface 125 or may be a separate element, such as a retaining ring, added to the receiving portion outside surface 125, for example in a circumferential groove.

FIG. 4 is representative of an embodiment of a quick release attachment assembly with the shield 112 in a second position. The illustrative embodiment in FIG. 4 is similar to the assembly of FIG. 3 in function, but it includes two retaining balls 130 according to embodiments of this disclosure. In the second position, shield 112 is displaced in the distal direction, for example by an attachment insert 146 received within the receiving cavity 124. Once received within the receiving cavity 124 and displaced in the distal direction, attachment insert 146 distally displaces the shield 112 against the resistive force of inner resilient member 114. Once the shield 112 is distal of the through holes 128, retaining balls 130 are free to move radially inward toward the receiving cavity 124 to the loaded position of FIG. 4. In some embodiments the attachment insert 146 includes a receptacle 148 to receive retaining balls 130 as they moves radially inward under the urging of the transition area 138 and D4 formed in the proximal portion of outer retainer 132. In some embodiments, receptacle 148 is a circumferential groove formed in the attachment insert 146 to receive one or more retaining balls 130 (two retaining balls 130 shown in FIG. 4).

Once the retaining balls 130 move radially inward, outer resilient member 140 urges the outer retainer 132 in a distal direction, i.e., vertically upward as illustrated in FIG. 4.

Distal displacement of the outer retainer 132 relative to the body 102 is limited by transition area 138 contacting the lip 142.

The inner resilient member 114 is compressed by the distal displacement of the shield 112 in the second position of FIG. 4. The inner resilient member 114 continues to urge the shield 112 in the proximal direction. Proximal displacement of the shield 112 is resisted by the retaining balls 130 fixed axially in the through holes 128 and the receptacle 148. The retaining balls 130 are fixed radially between the receptacle 148 and the proximal internal diameter D4 of the outer retainer 132.

Attachment insert 146 is restrained from axial displacement within the receiving cavity 124 (FIG. 3) by retaining balls 130 which are fixed radially and axially as described above. In some embodiments, attachment insert 146 outer surface 150 is configured to correspond with the cavity walls 126 defining the receiving cavity 124. The outer surface 150 of the attachment insert 148 cooperates with the cavity walls 126 of the receiving cavity 124 fixes the attachment insert 146 against rotational displacement relative to the receiving cavity 124. For example, if the receiving cavity 124 is defined by six similarly sized and evenly spaced cavity walls 126, attachment insert 146 also has six sides, sized and spaced to be slidingly received within the receiving cavity 124 in an axial direction but locked for rotational displacement about the vertical axis V with the body 102.

The cooperation of the retaining balls 130 with the receptacle 148 fixes the attachment insert 146 axially in the receiving cavity 124. The outer surface 150 cooperates with the cavity walls 126 to resist relative rotational displacement between the attachment insert 146 and the receiving cavity 124. Consequently, when assembled in the second position of FIG. 4, attachment insert 146 is supported against displacement in the vertical direction of vertical axis V and supported for rotation R in the clockwise direction, the counter-clockwise direct, or alternatingly in clockwise and counter-clockwise directions when a torque T is applied to the shank portion 104.

In order to disengage the attachment insert 146 from the receiving cavity 124, outer retainer 132 is displaced proximally, i.e., vertically downward. When outer retainer 132 is displaced sufficiently to allow the retaining balls 130 to enter transition area 138, inner resilient member 114 urges shield 112 and attachment insert 146 vertically downward. The configuration of receptacle 148 urges retaining ball 130 radially outward, freeing the attachment insert 146 for proximal displacement. In some embodiments, once the retaining balls 130 are displaced radially outward, the attachment insert 146 displaces proximally under its own weight. In embodiments, disengaging the attachment insert 146 is achieved by displacing the outer retainer 132 vertically downward, freeing the attachment insert 146 to displace vertically downward from the attachment assembly 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An attachment assembly on a stand mixer, the attachment assembly comprising:

a body having a distal end with a shank portion and a proximal end with a receiving portion, the receiving portion including at least a first wall defining an insert receiving cavity, the first wall having a first through hole formed radially therethrough;

an outer retainer disposed around an outside surface of the receiving portion and supported for axial displacement;

a shield arranged in the receiving portion and supported for axial displacement between a first position and a second position distal to the first position; and a retaining ball received within the first through hole for displacement between an unloaded position and a loaded position;

a post having a head at a proximal portion, wherein the head restrains axial displacement of the shield in a proximal direction at the first position, wherein the shield in the first position radially supports the retaining ball in the unloaded position and the retaining ball moves radially inward to the loaded position when the shield is in the second position.

2. The attachment assembly of claim 1, wherein an outside surface of the receiving portion is cylindrically shaped and an inner surface of the outer retainer is cylindrically shaped to slidingly engage with the outside surface of the receiving portion.

3. The attachment assembly of claim 2, wherein the inner surface of the outer retainer has a first diameter at a proximal portion and a second diameter at a distal portion, the first diameter being smaller than the second diameter.

4. The attachment assembly of claim 3, wherein a transition area is provided between the first diameter at the proximal portion and the second diameter at the distal portion.

5. The attachment assembly of claim 3, wherein the shield in the first position radially biases the retaining ball against the second diameter.

6. The attachment assembly of claim 2, further comprising an outer resilient member biasing the outer retainer towards the distal end of the body.

7. The attachment assembly of claim 6, wherein the outer resilient member is constrained between a lip on the outside surface of the body and a spring retainer at the distal end of the outer retainer.

8. The attachment assembly of claim 1, the post further comprising an external thread at a distal portion to meshingly engage with a set of internal threads in the body.

9. The attachment assembly of claim 1, further comprising an inner resilient member biasing the shield against the head when the shield is in the first position.

10. The attachment assembly of claim 1 further comprising a plurality of walls defining the insert receiving cavity.

11. The attachment assembly of claim 10 wherein an outer perimeter of the shield is a polygon comprised of a plurality of sides matching the plurality of walls of the insert receiving cavity.

12. The attachment assembly of claim 10 wherein the insert receiving cavity comprises six walls.

13. The attachment assembly of claim 1 wherein the retaining ball is spherical.

14. The attachment assembly of claim 1, wherein the shank portion, the receiving portion, and the outer retainer are axially aligned.

15. The attachment assembly of claim 1, wherein the receiving portion further comprises a second wall defining the insert receiving cavity, the second wall having a second through hole formed therethrough.

16. The attachment assembly of claim 15, wherein the first through hole receives a first retaining ball and the second through hole receives a second retaining ball, each retaining ball received for displacement between an unloaded position and a loaded position.

17. The attachment assembly of claim 15, wherein the first through hole and the second through hole are diametrically opposed.

18. An attachment assembly on a stand mixer, the attachment assembly comprising:

a body having a distal end with a shank portion and a proximal end with a receiving portion, the receiving portion including six cavity walls defining an insert receiving cavity, a first cavity wall having a first through hole formed therethrough and a second cavity wall having a second through hole formed therethrough;

an outer retainer disposed around an outside surface of the receiving portion and supported for axial displacement;

a shield arranged in the insert receiving cavity and supported for axial displacement between a first position and a second position distal to the first position;

a first retaining ball received within the first through hole for displacement between an unloaded position and a loaded position; and a second retaining ball received within the second through hole for displacement between an unloaded position and a loaded position, wherein the shield in the first position radially supports the first and second retaining balls in the unloaded position, wherein an outside surface of the receiving portion is cylindrically shaped and an inner surface of the outer retainer is cylindrically shaped to slidingly engage with the outside surface of the receiving portion, and wherein an outer resilient member biases the outer retainer towards the distal end of the body.

19. The attachment assembly of claim 18, wherein the first cavity wall and the second cavity wall are diametrically opposed.

20. An attachment assembly on a stand mixer, the attachment assembly comprising:

a body having a distal end with a shank portion and a proximal end with a receiving portion, the receiving portion including at least a first wall defining an insert receiving cavity, the first wall having a first through hole formed radially therethrough;

an outer retainer disposed around an outside surface of the receiving portion and supported for axial displacement;

a shield arranged in the receiving portion and supported for axial displacement between a first position and a second position distal to the first position; and a retaining ball received within the first through hole for displacement between an unloaded position and a loaded position, wherein the shield in the first position radially supports the retaining ball in the unloaded position and the retaining ball moves radially inward to the loaded position when the shield is in the second position, wherein an outside surface of the receiving portion is cylindrically shaped and an inner surface of the outer retainer is cylindrically shaped to slidingly engage with the outside surface of the receiving portion, and wherein an outer resilient member biases the outer retainer towards the distal end of the body.

* * * * *